United States Patent Office.

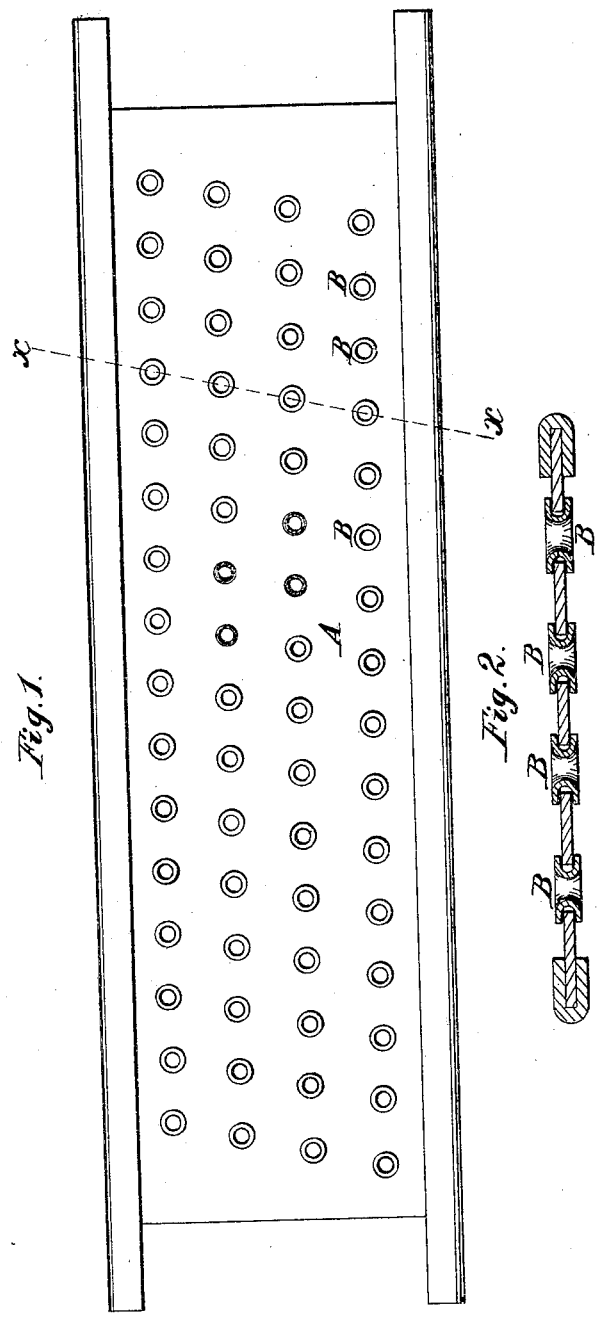

AMBROSE J. NICHOLS, OF NORTH PROVIDENCE, RHODE ISLAND

Letters Patent No. 69,471, dated October 1, 1867.

IMPROVEMENT IN WARPER AND DRESSER-PLATES.

The Schedule referred to in these Letters Patent and making part of the same.

TO ALL WHOM IT MAY CONCERN:

Be it known that I, AMBROSE J. NICHOLS, of North Providence, in the county of Providence, and State o Rhode Island, have invented a new and useful Improvement in Dresser-Coppers and Warper-Plates; and I do hereby declare that the following is a full, clear, and exact description thereof, which will enable others skilled in the art to make and use the same, reference being had to the accompanying drawings, forming part of this specification.

This invention relates to machinery for the manufacture of textile fabrics, and it consists in an improvement in dresser-plates or "coppers," as they are usually called by manufacturers, and which improvement is also applicable to warper-plates, as both the dresser and warper are used for similar purposes.

As these coppers have usually been made, the holes through which the threads pass have been made by punching merely, which leaves a wearing-surface of only the thickness of the plate, which soon becomes worn by the thread in such a manner that it is rendered unfit for use. My improvement consists in attaching eyelets to the holes, as will be hereinafter described. The drawing—

Figure 1, represents a dresser-copper complete, showing the holes through the same protected by eyelets.

Figure 2 is a cross-section of the same through the line $x$ $x$, it being enlarged in size in order to show to better advantage the manner in which the eyelets are attached.

Similar letters of reference indicate like parts.

A is the plate or "copper," and B represents the eyelets. There is nothing peculiar in the eyelets or the manner of their attachment, only they are not pressed down on to the plate tightly, but are designed to be left loose, so that they may turn round in the plate, and thereby allow the thread to wear equally upon all sides, instead of wearing a channel or channels, as it does in the plate when the eyelet is not attached.

Having thus described my invention, I claim as new, and desire to secure by Letters Patent—

The eyelets B, when placed in the holes in the copper A in such a manner as to turn loosely therein, and allow the thread to wear equally upon all sides, and prevent the formation of channels, as herein shown and described.

The above specification of my invention signed by me this 7th day of June, 1867.

AMBROSE J. NICHOLS.

Witnesses:
JOHN B. NICHOLS,
GEO. H. DOWNER.